Aug. 17, 1948.                G. KEINATH                2,447,018
                        THREE-MAGNITUDE RECORDER
Filed April 18, 1945                              2 Sheets-Sheet 1
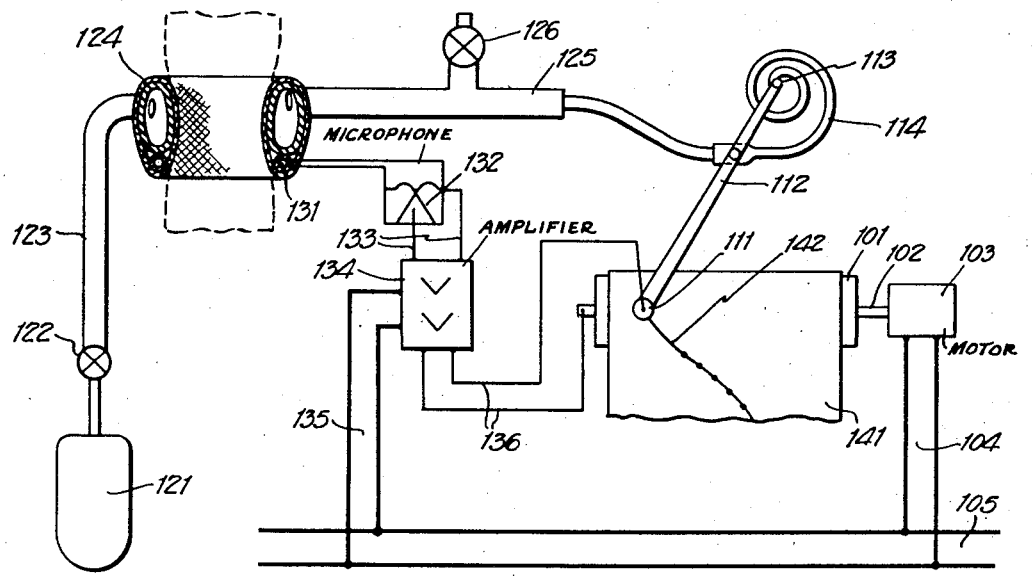
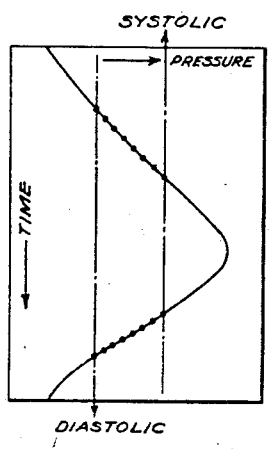
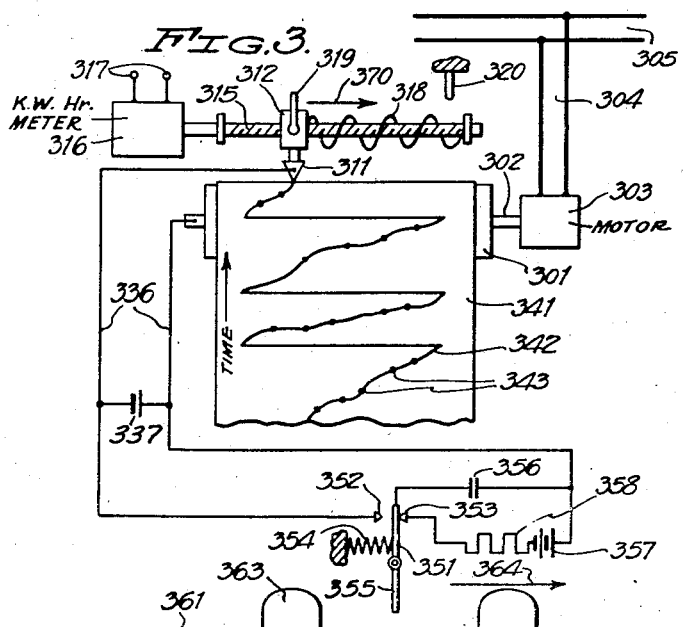
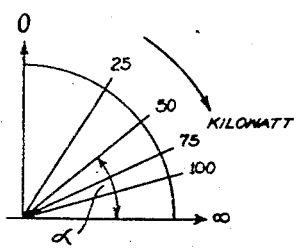
INVENTOR.
GEORGE KEINATH.
BY Aug. 17, 1948.                    G. KEINATH                    2,447,018
                            THREE-MAGNITUDE RECORDER
Filed April 18, 1945                                      2 Sheets-Sheet 2
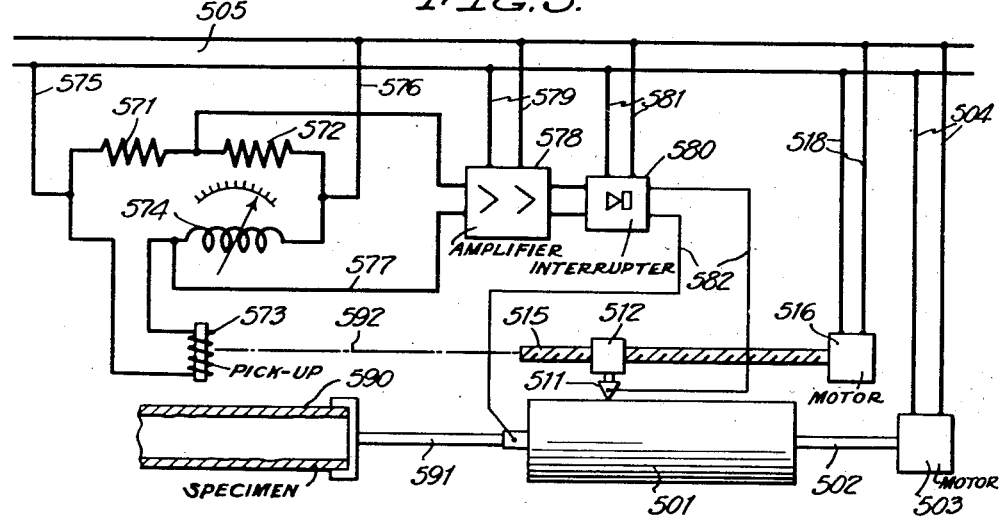
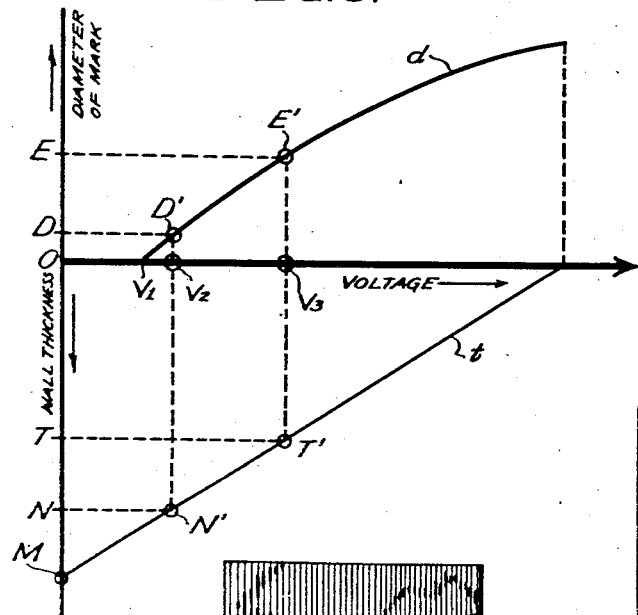
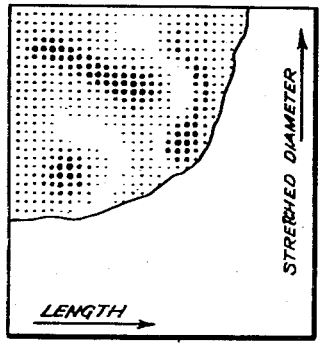
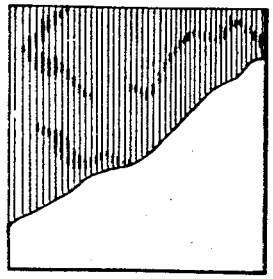
INVENTOR.
GEORGE KEINATH.
BY Patented Aug. 17, 1948

2,447,018

UNITED STATES PATENT OFFICE 2,447,018

THREE-MAGNITUDE RECORDER

George Keinath, Larchmont, N. Y.

Application April 18, 1945, Serial No. 588,951

8 Claims. (Cl. 128—2.05)

My invention concerns apparatus for recording three or more measuring magnitudes on a common recording chart in correlation to one another, and was previously referred to by my copending application Serial No. 470,440, filed December 29, 1942, abandoned, and now replaced by the present case which represents a continuation-in-part of the superseded application.

The customary recording apparatus for measuring and control purposes are so designed that two variable measuring or control magnitudes are recorded on a chart so as to be depicted by a diagram or curve representing a function of the two magnitudes. For instance, when recording an electric current in dependence upon time, a curve is recorded as a function of both determinants, the two coordinates of each point of the curve in the coordinate system of the chart being indicative of an instantaneous current value in relation to the appertaining moment of time. Similar records are produced when determining, for instance, current versus voltage, pressure versus temperature, or any other two variable and correlated measuring magnitudes. Recording diagrams of this type are definite and directly readable as to the values and mutual coordination of the recorded magnitudes.

It has been a problem, however, to obtain equally satisfactory and convenient results when more than two correlated magnitudes are to be recorded. For example, a known apparatus for testing materials by subjecting a specimen to variable mechanical stress at a variable temperature and determining its corresponding dilation is designed for recording a time-dilation curve and a temperature-dilation curve with or without a separately recorded temperature-time curve. These two or three curves, though appearing on a common chart, are separate diagrams and have separate coordinate systems so that the interrelation of the three magnitudes is not directly depicted and must be determined by calculation or construction.

It is an object of my invention to provide means for obtaining in a measuring system a record of three or more variable magnitudes so that the correlation of these magnitudes is directly indicated in the recorded diagram.

To this end, and in accordance with the invention, I provide a measuring apparatus designed and operative as follows. The apparatus has a stylus member movable relative to a chart-accommodating surface member. The relative motion of these members is controlled in two coordinate directions and in dependence upon two of the three magnitudes to be recorded. As a result, the recorded diagram represents a function of these two magnitudes similar to the record obtained in the customary two-magnitude recorders. However, the invention requires also means which are responsive to the third magnitude and so connected to the stylus member as to control the thickness or frequency of the recorded marks.

In one aspect of my invention, the control responsive to the third magnitude is effective in intervals, so that the spacing on the chart between subsequent superimposed marks, or the number of these marks over a chosen length of the correlated recorded curve is a measure of the third magnitude. In another aspect of the invention, the thickness or diameter of the marks or curve is varied in accordance with the third magnitude and hence indicative of that magnitude.

According to another feature of the invention, an electroresponsive recording chart such as electrolytic recording paper is employed, and the record is produced by an electric current passing through the stylus and chart and the voltage of the marking current is controlled in accordance with the third magnitude so that the thickness of the recorded marks varies accordingly.

The means employed according to the invention in accordance with the foregoing characteristics will best be understood from a description of the embodiments shown in the drawing in which—

Figure 1 illustrates diagrammatically a measuring apparatus for recording the blood pressure and pulse of a patient and Fig. 2 a chart as obtained with such an apparatus.

Fig. 3 shows a recording device for supervising machines or factory units as to their consumption of energy relative to the production output, while Fig. 4 is an explanatory diagram relating to the same embodiment.

Fig. 5 represents an apparatus for testing the effective wall thickness of pipes or tubes and recording the location and degree of faults, Fig. 6 being an explanatory diagram relative to the same apparatus and Fig. 7 an illustration of a record of the type obtainable in such an apparatus, while Fig. 8 typifies a record obtainable with a somewhat modified form of an apparatus according to Fig. 5.

The blood pressure and pulse recorder according to Fig. 1 comprises an inflatable tourniquet or blood-pressure responsive gauge means to be strapped to the arm of a patient. The tourniquet is connected with a pressure flask 121 or the like accumulator by a regulating valve 122 and a conduit 123. Another conduit 125, provided with an escape valve 126, connects the tourniquet 124 with a pressure-responsive control element 114 of the Bourdon type.

A revolving cylinder or drum member 101 of a recorder mechanism has its shaft 102 coupled with a motor 103, fed from a current source 105 through leads 104, in order to be actuated in proportion to time. The drum member 101 accommodates an electrolytic recording chart 141 and forms a surface electrode for passing current through the chart.

A stylus member 111 is associated with the drum to produce a record on the sheet. Member 111 is carried by an arm journalled at 113 for effecting an oscillatory motion along the drum. The arm 112 is connected with the pressure-responsive control element 113 and hence moves automatically in proportion to the pressure effective in the tourniquet.

The stylus 111 forms an electrode for writing a continuous curve 142 on sheet 141. The inclination of the curve relative to the horizontal or vertical coordinate of the recorded diagram depends on the motion of the stylus as well as on that of the drum 101, and hence represents a function of pressure and time.

The stylus 111 lies in a control circuit 136 in series with the drum electrode 101. The circuit is connected with the output terminals of an amplifier 134 which is energized through leads 135 from the current source 105. The input leads 133 of the amplifier 134 are connected with a microphone 132, and the amplifier is so adjusted or grid biased that the voltage impressed on electrodes 101 and 111 and effective across the chart 141 is sufficient to mark the line 142 on chart 141. The microphone 132 is associated with the tourniquet, for instance by being attached to the bandage for fastening the tourniquet to the arm, and serves to modify the mark-producing voltage in response to the occurrence of audible pulse beats in the pressure intervals between the diastolic and systolic pressure limits.

When using the apparatus, with the tourniquet applied to the arm of the patient, the pressure in the tourniquet is caused to rise gradually by opening the valve 122 in a corresponding degree, the valve 126 being closed at this time. At the same time, the drive 103 is energized or released so that the sheet 141 progresses at a uniform and known speed while the stylus 111 moves across the paper in proportion to the increase of pressure.

As a result, a time-pressure curve 142 is recorded by the stylus electrode. When the pressure exceeds the diastolic limit, the pulse beats become audible and cause the microphone 132 to issue corresponding electric impulses through the amplifier 134 and across the gap between the electrode members 101 and 111. Each electric impulse produces a heavy mark or point on the electrolytic paper in superposition on the time-pressure curve.

When the increasing pressure passes beyond the systolic limit, the pulse beats cease to be sufficiently audible to operate the microphone, so that no further pulse marks are superimposed.

Now the valve 122 is closed and the escape valve 126 opened so that the tourniquet pressure decays, gradually passing again through the systolic-diastolic pressure range. Hence, another series of intermittent pulse marks is superimposed on the line 142.

The resulting diagram, as illustrated in Fig. 2, indicates directly the three essential magnitudes involved in the measurement, namely time, pressure and pulse frequency. The curve 142 is a function of the two former, the spacing between the superposed dots a function of the latter. The beginning and end of each series of dots along the pressure curve indicate the diastolic and systolic pressure, while the number of dots during a given and indicated interval of time shows the pulse frequency. In this manner, not only the time-pressure curve is recorded electrically by passing a constant or intermittent current through the stylus during the entire operating period of the pressure measurement, but the pulse beats are also electrically recorded by having the electric circuit control the writing operation of the same stylus.

Incidentally, this apparatus may also show some other magnitudes of interest. The degree of uniformity of the spacing between the dots is indicative of the regularity or irregularity of the pulse. The electrical constants of the microphone circuit can be adjusted to vary the intensity of the marking current or its voltage in accordance with the intensity of the pulse beats. Then, the diameter of the recorded pulse marks will vary correspondingly and thus depict the pulse intensity.

An advantage of blood pressure recorders according to the invention over those of known type is the fact that the pulse record is clearly distinct from the pressure-time record and yet definitely coordinated to the corresponding time-pressure curve. When merely recording the time-pressure curve, as is done in the known recorders, the pulse beats have the effect of modifying the pressure so that the curve shows ripples between the critical pressure limits. While the occurrence of these ripples may suffice for determining the systolic and diastolic pressure, they do not represent a separate pulse measurement and are not sufficiently distinct to afford a clear indication of the pulse frequency. In an apparatus according to the invention, the time-pressure curve may also show a disturbance between the critical blood pressure values, but no reliance is placed thereon as regards the pulse measurement. While in the known devices the recorded pressure fluctuations are ambiguous because they may also be caused by defective conduits or valves or by pressure fluctuations of the accumulator or other pressure source, the use of a coordinated but separate and different writing according to the invention ensures a univocal indication of both pulse and pressure despite the fact that both writings appear on a single chart.

Fig. 3 shows an operation recorder for measuring and recording the electric energy consumption in kilowatt hours (kw. hr.) of a machine aggregate or factory unit in relation to the number of articles produced by the unit. More particularly, the apparatus determines the kilowatt hours consumed over any chosen period of time as well as the production output during the same period, or the energy consumption per article produced.

A kilowatt hour meter 316 serving as a drive motor has its input terminals 317 connected with the supply mains of the unit under supervision. A worm shaft 315 is connected with the motor and serves to move a holder 312 of a recording stylus 311 in the direction of the arrow 370. A helical return spring 318 tends to counteract this motion. The engagement of holder 312 with driving shaft 315 is releasable, a release member 319 being provided to effect a temporary disconnection when turned counterclockwise by a stationary stop 320 located at the end of the path of travel of the holder 312. When thus released, the holder is moved back into its starting position by the spring 318.

The stylus electrode 311 is part of a recording mechanism and cooperates with a cylinder electrode 301 for accommodating and transporting a recording sheet 341 of the electrolytic type. The cylinder 302 is rotated by a motor 303 fed through leads 304 from a suitable current source 305. The feed motion of the chart is proportional to time.

When in use, the stylus moves along the paper at a speed depending upon the current consumption measured by the motoric device 316. Hence, the inclination of the curve 342 recorded on chart 341 is indicative of the instantaneous consumption value at the moment of the appertaining curve point. The diagram shown in Fig. 4 exemplifies the relation of the angle of inclination α to the measured kilowatt (kw.) values. After the completion of its wattmetrically controlled progression, the stylus snaps back to the starting point, thus recording a straight line perpendicular to the time axis of the recording chart. The distance between two successive lines is indicative of the time within which a given quantity of energy has been consumed.

The stylus 311 and the transport cylinder 301 serve as electrodes of a control circuit 336 which contains energy supply means, here shown as a current source 337, and is connected with the contacts 351, 352 and 353 of a relay or switch. A discharge circuit of a condenser 356, a current source 357 and a resistor 358 extends between the movable contact 351 and the stationary contact 353 of the switch. A spring 354, acting on the movable contact 351, tends to keep the latter in engagement with contact 353 so that the condenser 356 is charged by the current source 357 when the switch is in the illustrated, inoperative position.

A conveyor belt 361, driven or guided by a roller 362, serves to transport the articles 363 away from the factory unit, these articles representing the output of the unit under supervision. An actuating member 355 of the switch projects into the path of the articles so that each time an article 363 passes by, the movable contact 351 shifts temporarily from contact 353 to contact 352. This causes the condenser 356 to discharge itself through the circuit 336 and the electrodes 301 and 311 and increases the voltage between electrodes 301 and 311 with the effect of superposing a point mark 343 on the time-consumption curve 342.

The complete record thus obtained depicts directly the magnitudes of energy, time and output in proper correlation to one another and affords an indication of a number of interesting data. The energy consumption per piece is apparent from the increase of energy between two successive point marks. The degree of uniformity of operation is determined by that of the spacing between successive points. The number of pieces produced per unit of consumption can be judged from the number of points marked between the successive straight lines of the diagram. The number of pieces per length of time is directly shown by a corresponding number of point marks within the chosen period of time. The energy consumption per day or shift as well as the output in pieces per day or shift are likewise seen from the chart.

The above-described operation recorder is related to the operation recorders disclosed in my copending application Serial No. 567,356, filed December 9, 1944.

Fig. 5 shows an apparatus for testing pipes or the like cylindrical bodies of metallic, preferably magnetizable, material as to irregularities of their wall thickness. Two of the three effective control magnitudes are represented by the two components of a scanning motion, while the third magnitude is the effective wall thickness at the scanning point or an electric magnitude depending on this wall thickness.

In Fig. 5, numeral 501 denotes a drum electrode for accommodating the recording sheet on its peripheral surface. The drum shaft 502 is rotated by a motor 503 connected by leads 504 with a current source 505. The stylus electrode 511 of the recording mechanism is carried by a holder 512. The holder engages a threaded shaft 515 driven by another motor 516 whose inleads are also connected with the line 505. When in operation, motors 503 and 516 run simultaneously so that the drum 501 rotates while the stylus 511 progresses in a uniform direction along the drum. Consequently, the peripheral drum surface and the chart placed thereon are scanned by the stylus.

590 denotes the specimen to be tested. It is connected with the drum 501 or its drive by a shaft 591 in order to rotate in synchronism with the drum. A movable electromagnetic gauge or pick-up member 573 is similarly coupled through a connection 592 with the stylus 511 or its drive to progress in synchronism with the stylus while scanning the peripheral surface of the specimen.

The inductance of the pick-up member 573 is controlled by the metallic or magnetic material of the specimen and, hence, varies in dependence upon the wall thickness of the specimen at the location of the control element. These inductance variations are measured by a bridge circuit which comprises the pick-up element 573 in series connection with two constant impedance elements 571 and 572 and a variable impedance element 574. The bridge circuit is energized from the line 505 through leads 575 and 576, and has its diagonal branch 577 connected to the input terminals of an amplifier 578. The amplifier is energized through leads 579 from source 505. The output circuit of the amplifier extends through an interrupter 580 and leads 582 to the stylus 511 and the drum 501. The interrupter 580 consists preferably of a vibratory contactor or rectifier and is energized through line connections 581.

The bridge circuit is adjusted by means of the variable impedance element 574 so that it is out of balance when performing a test. As a result, the diagonal branch is normally traversed by an unbalance current which, during a test, does not reverse its direction of flow but varies its voltage in accordance with the impedance variations of element 573, i. e. in dependence upon the occurrence of flaws, cracks or other irregularities in the specimen.

The adjustment and operation of the bridge and recorder circuits will be understood from the following discussion of the diagram shown in Fig. 6. The abscissa of the diagram represents voltages increasing from the zero point 0 towards the right-hand side of the diagram. The lower portion of the ordinate represents the wall thickness of the specimen increasing from the zero point 0 in the downward direction. The upper portion of the ordinate represents the diameter or width of the recording mark increasing from the zero point 0 in the upward direction. Curve d exemplifies the dependence of the diameter of the mark recorded on the electrolytic sheet in dependence upon the voltage applied to the sheet. At low voltages up to the voltage $V_1$, no mark is produce. At a voltage $V_2$, the diameter of the mark is proportional to the value D corresponding to the curve point D' over $V_2$. At a still higher voltage $V_3$, corresponding to the curve point E', the diameter is still larger as indicated by the value E. For example, an available electrolyte paper does not show a blackening up to a voltage of almost 80 volts. At 80 volts a light mark is produced of about $\frac{1}{10}$ of a millimeter. The marks become heavier at increasing voltages and have a diameter of about 1 millimeter at a voltage of about 220 volts.

Curve t is characteristic of the unbalance voltage of the measuring bridge in dependence upon the wall thickness at the measuring point of the specimen. The adjustment of the bridge element 574 is so chosen that the voltage at the expected maximum thickness M of the specimen is a minimum so that the voltage effective between the electrodes 501 and 511 is too low to produce a recording mark. At the normal wall thickness N of the specimen, corresponding to the curve point N', the effective voltage is $V_2$, i. e. just enough to produce a thin recording mark indicative of the position of the control element 573 relative to the specimen. Any smaller wall thickness, such as the one denoted by T and T', will then produce a higher voltage, such as $V_3$, and hence increase the diameter of the recording mark. The adjustable impedance element is preferably provided with a pointer and scale to be pre-set to the normal value N of the wall thickness desired in the specimen to be tested.

Due to the action of the interrupter 580, the record marks thus produced consist of dots. Each dot represents the location of the control element as to both the lateral and peripheral components. The dots are of very small diameter wherever the wall thickness is normal or above normal, but have a larger diameter wherever the thickness is below normal. That is, the third magnitude indicative of the wall thickness is represented in the recorded diagram by the variation in blackening at its points of occurrence.

A diagram sheet of the type just mentioned is shown in Fig. 7. The dot marks show flaws, cracks and the like faults of the specimen as to their location and intensity. If the interrupter 580 is omitted, the marks appear as parallel lines of varying thickness. A diagram of the latter type is exemplified by Fig. 8.

I claim:

1. Apparatus for recording three correlated magnitudes on an electroresponsive recording chart, comprising a rotatable surface electrode for accommodating the chart, a stylus electrode reciprocable relative to said surface electrode, drive means connected with said surface electrode for rotating it in accordance with one of said magnitudes, drive means connected with said stylus electrode for moving it in accordance with another one of said magnitudes, an electric circuit connected to said electrodes and having continuous-energy supply means for continuously applying a mark-producing voltage across the chart, and control means associated with said circuit for varying said voltage in accordance with said third magnitude so as to impose a corresponding thickness variation on the recorded marks.

2. An operation recorder, comprising a surface electrode for accommodating an electroresponsive recording chart and a stylus electrode disposed to permit relative motion between stylus electrode and chart in two coordinate directions, time-proportional drive means for controlling said motion in one of said directions, measuring means responsive to an input quantity of an operation under observation, drive means controlled by said measuring means and disposed for controlling said relative motion in said other coordinate direction, electric circuit means connected to said electrodes for applying a voltage across the chart in order to cause said stylus to trace a time-quantity line on the chart, and control means responsive to an output quantity of said operation and associated with said circuit means for controlling said voltage so as to vary the thickness of said line in order to thereby indicate the correlation of the output quantity to the time-quantity record.

3. Apparatus for recording irregularities of a specimen as to their degree and their location in two dimensions of a coordinate system, comprising a movable surface electrode for accommodating an electroresponsive recording chart, a stylus electrode movable at an angle to the motion of said surface electrode and arranged for producing recording marks on the chart, drive means for moving the specimen and said surface electrode in synchronism with each other, an electric gauge element responsive to a condition to be tested, actuating means for moving said stylus electrode and said gauge element in synchronism with each other so that the varying position of said stylus electrode relative to said surface electrode corresponds to the position of said gauge element relative to the specimen when said drive means and actuating means are in operation, electric circuit means controlled by said gauge element and connected to said electrodes to apply thereto a voltage varying in dependence upon the variation of said condition for marking the chart accordingly, whereby the recorded marks indicate irregularities of the specimen in showing their location by a corresponding location of the marks on the recording chart and their degree by a corresponding variation in heaviness of these marks.

4. Apparatus for recording irregularities of a specimen as to their degree and their location in two dimensions of a coordinate system, comprising a movable surface electrode for accommodating an electroresponsive recording chart, a stylus electrode movable at an angle to the motion of said surface electrode and arranged for producing recording marks on the chart, drive means for moving the specimen and said surface electrode in synchronism with each other, an electric gauge element responsive to a condition to be tested, actuating means for moving said stylus electrode and said gauge element in synchronism with each other so that the varying position of said stylus electrode relative to said electrode member corresponds to the position of said gauge element relative to the specimen when said drive means and actuating means are in operation, electric circuit means controlled by said gauge element and connected with said electrodes to apply to the chart a mark-producing voltage varying in response to the variations of said condition, and periodically operating interrupting means associated with said circuit means so that said voltage is intermittent so that the recorded marks consist of spaced points indicating by their position the location and by their thickness the degree of the irregularities to be determined.

5. Apparatus for recording the condition of a specimen as regards degree and location, comprising a surface member for accommodating a record chart and a stylus member movable relative to each other in two coordinate directions, a holding device for accommodating the specimen, a pick-up device, said two devices being movable relative to each other in two coordinate directions correlated to the aforementioned two directions respectively, a drive having means for producing relative motion between said two members and means for producing relative motion between said two devices so that the chart is scanned by said stylus member while the specimen is scanned by said pick-up device, electric circuit means controlled by said pick-up device and connected to said stylus member to control the marking operation of the latter in dependence upon the degree of said condition responded to by said pick-up device so as to produce recording marks whose width varies in accordance with said degree, whereby the record produced on the chart indicates the location and degree of the condition under observation by the location and width respectively of the recorded marks.

6. Measuring apparatus for recording two of variable measuring magnitudes versus a common reference magnitude on an electroresponsive chart, comprising a recording device having a chart-accommodating surface member and a chart marking stylus electrode member capable of motion relative to each other in two coordinate directions, drive means connected to said device for imparting said relative motion in one of said directions in accordance with said reference magnitude, drive means connected to said device for imparting said relative motion in said other direction, circuit means attached to said electrode member for applying mark-producing voltages thereto during the performance of said latter drive means so as to cause said electrode member to produce marks indicative of said two measuring magnitudes respectively, said circuit means including two voltage sources of different respective voltage values, and control means responsive to one of said measuring magnitudes and connected with one of said voltage sources for controlling the latter source to cause said electrode member to produce marks indicative of said one measuring magnitude and distinguished by different thickness from the marks produced by said other source and indicative of said other measuring magnitude.

7. Apparatus for recording three correlated magnitudes on an electroresponsive recording chart, comprising a recording device having a surface electrode for accommodating the chart and a stylus electrode for marking a record on the chart, said electrodes being arranged to permit relative motion between stylus electrode and chart in two coordinate directions, drive means connected to said device for imparting said relative motion in one of said directions in accordance with one of said magnitudes, drive means connected to said device for imparting said relative motion in said other direction in accordance with another one of said magnitudes, an electric circuit attached across said electrodes, means for providing continuous electric energy connected with said circuit for causing it to continuously apply a mark-producing voltage between said electrodes, and control means responsive to said third magnitude and connected with said circuit for controlling said voltage so as to vary the thickness of the marks in dependence upon variations of said third magnitude.

8. A blood pressure recorder, comprising a recording device having a surface electrode for accommodating an electroresponsive recording chart and a stylus electrode disposed to permit relative motion between stylus electrode and chart in two coordinate directions, time-proportional drive means connected with said device for controlling said relative motion in one of said coordinate directions, blood-pressure responsive gauge means, drive means controlled by said gauge means and connected with said device for controlling said relative motion in said other coordinate direction, electric circuit means connected to said electrodes for applying a voltage across the chart in order to cause said stylus to trace a time-pressure line on the sheet, and pulse-beat responsive gauge means associated with said circuit means for controlling said voltage so as to vary the thickness of said line in order to indicate the correlation of the pulse beats to the time-pressure record.

GEORGE KEINATH.

REFERENCES CITED

The following references are of record in the file of this patent:

UNITED STATES PATENTS

| Number | Name | Date |
|---|---|---|
| 1,655,615 | Kreisel | Jan. 10, 1928 |
| 2,171,327 | Anderson | Aug. 29, 1939 |
| 2,202,935 | Weiss | June 4, 1940 |

FOREIGN PATENTS

| Number | Country | Date |
|---|---|---|
| 594,675 | Germany | Mar. 20, 1934 |